United States Patent [19]

Blakeley

[11] 4,391,458

[45] Jul. 5, 1983

[54] PIPE COUPLING WITH GASKET LOCATING MEANS

[75] Inventor: James Blakeley, Thornhill, Canada

[73] Assignee: Blakeley Engineering Limited, Thornhill, Canada

[21] Appl. No.: 252,921

[22] Filed: Apr. 10, 1981

[51] Int. Cl.³ .................... F16L 21/06; F16L 41/00
[52] U.S. Cl. ................................. 285/112; 285/197; 285/373
[58] Field of Search ................ 285/373, 197, 112; 411/512, 337, 360

[56] References Cited

U.S. PATENT DOCUMENTS

| 1,970,078 | 8/1934 | Dillon | 285/112 X |
|---|---|---|---|
| 2,036,320 | 4/1936 | Connelly et al. | |
| 2,417,741 | 3/1947 | Dillon | |
| 2,463,235 | 3/1949 | Andrews | |
| 2,690,193 | 9/1954 | Smith | 285/373 X |
| 3,355,794 | 12/1967 | Adams | |
| 3,362,730 | 1/1968 | St. Clair et al. | 285/112 X |
| 3,467,141 | 9/1969 | Smith | 285/373 X |
| 3,471,176 | 10/1969 | Gilchrist | 285/197 X |
| 3,479,066 | 11/1969 | Gittleman | 285/373 X |
| 3,664,691 | 5/1972 | Nakamura | 285/112 |
| 3,672,613 | 6/1972 | Oriani | 285/373 X |
| 3,680,894 | 8/1972 | Young | 285/112 |
| 3,861,422 | 1/1975 | Christie | 285/373 X |

FOREIGN PATENT DOCUMENTS

| 227512 | 4/1960 | Australia | 285/373 |
| 938951 | 12/1973 | Canada | 285/112 |

Primary Examiner—Thomas F. Callaghan
Attorney, Agent, or Firm—Ridout & Maybee

[57] ABSTRACT

A side-outlet pipe coupling having a split housing surrounding split-ring gasket means is provided. Lugs formed at the free ends of the gasket means position said gasket means within the coupling housing such that abutting free ends of the gasket means are off-set from the plane of splitting of the housing.

5 Claims, 13 Drawing Figures

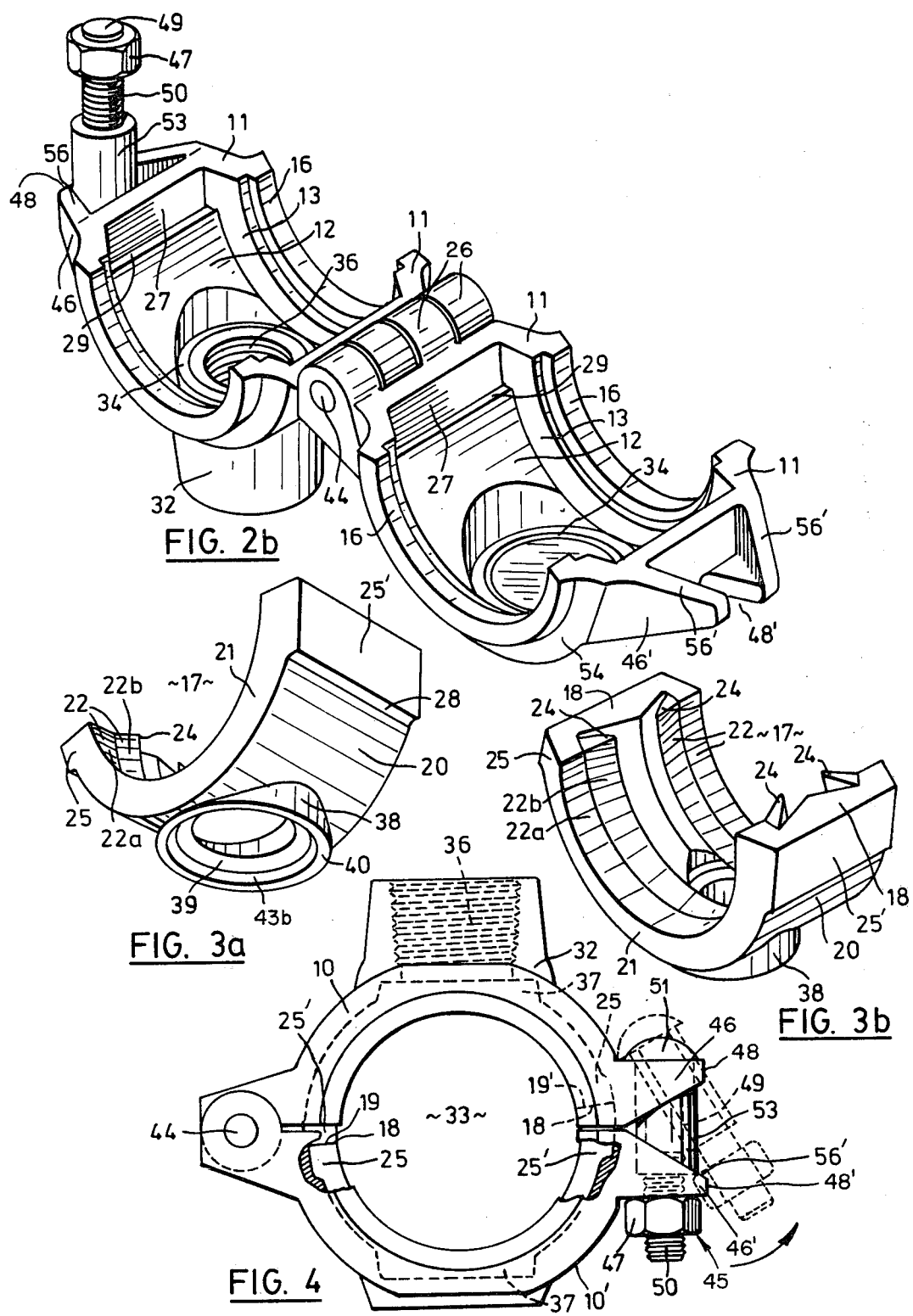

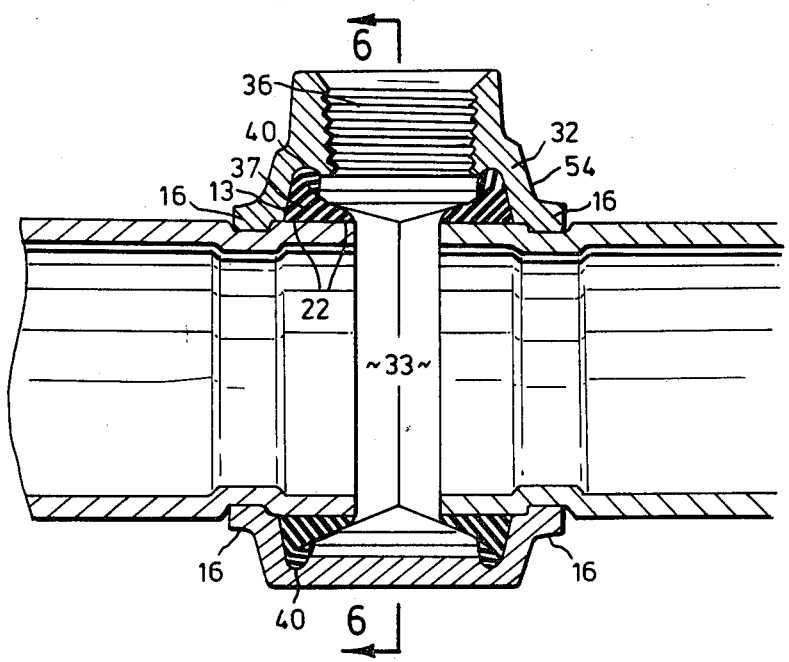
FIG. 5
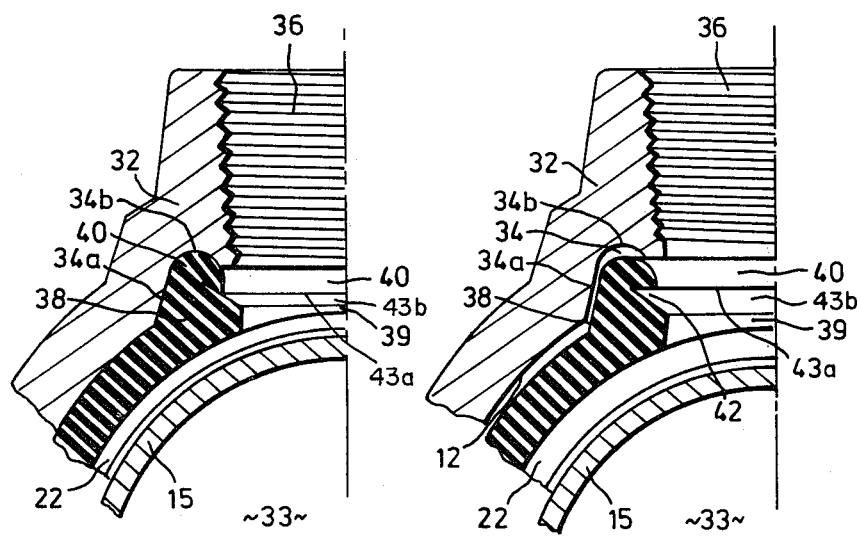
FIG. 6
FIG. 7

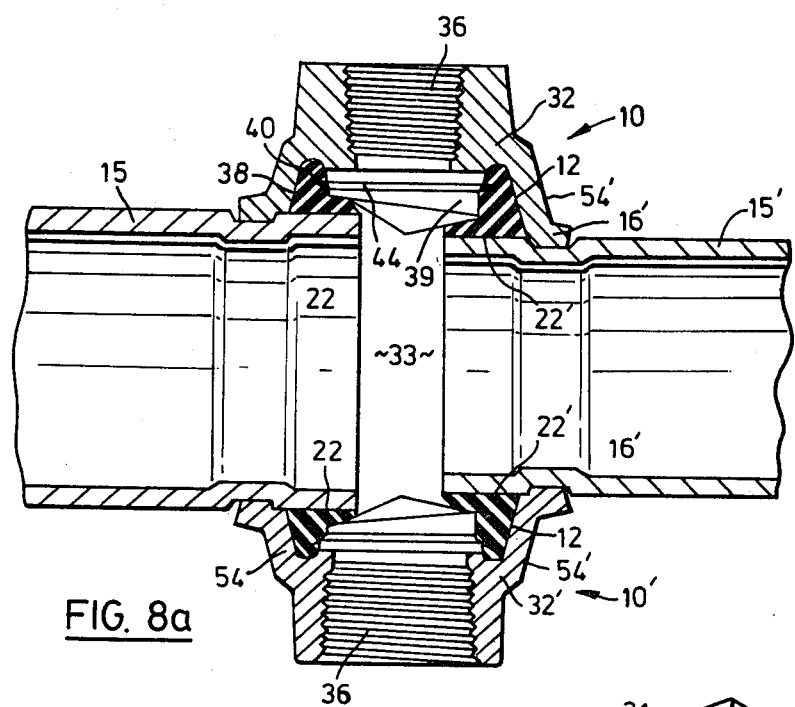
FIG. 8a
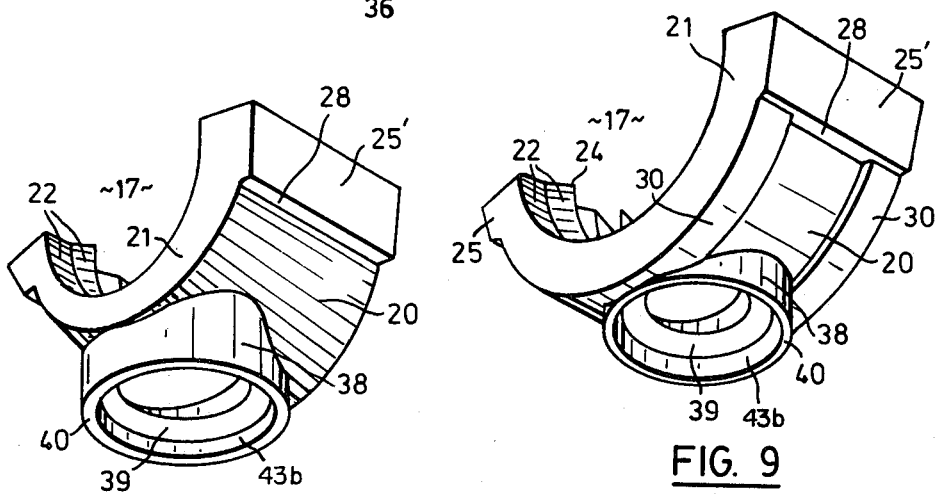
FIG. 8b
FIG. 9
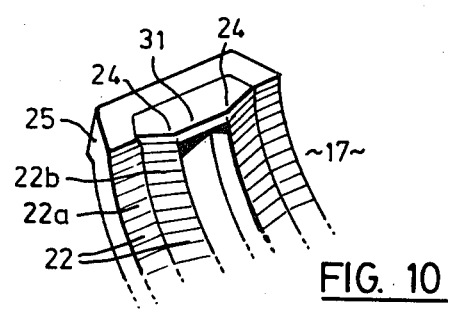
FIG. 10

4,391,458

PIPE COUPLING WITH GASKET LOCATING MEANS

FIELD OF THE INVENTION

This invention relates to pipe couplings used for the joining of pipes, and more particularly to improvements in the gasketing employed in such couplings.

BACKGROUND AND SUMMARY OF THE INVENTION

In the coupling of grooved-end pressure pipes, two basic designs of couplings are commonly known. In the first design, a full-ring resilient gasket of generally C-shaped cross-section is used to surround the joint, two half-round housing segments being clamped together around the gasket. In a variation of this design, the two housing segments are hinged together at one side of the joint, and clamped together at the other side. In the second known design, a split-ring gasket is employed within the housing segments. Such gasket may be formed in one piece, with a single break in its circular continuity defining two free ends, or may be formed of several arcuate sections each having two free ends, the several sections together defining a circle.

Both of these known coupling designs have undesirable limitations. For example, the grooving of the pipe ends used in conjunction with these couplings is carried out through either roll-forming or cut-grooving. The full-ring gasket must be forced over the grooved pipe-ends when assembling the coupling, as the inside sealing diameter of the full-ring gasket is normally smaller than the pipe diameter. It is, therefore, desirable to have the pipe-end surface uniform in diameter and free of sharp edges. However, contrary to this requirement, the roll-grooving process tends to flare the pipe-end diameter and most methods used in cutting the pipes to length tend to leave sharp end edges, thus increasing the degree of difficulty in urging the full-ring gasket over the adjoining pipe-ends, and also increasing the danger of damaging the internal sealing lips of the full-ring gasket.

Another limiting factor of full-ring couplings is the difficulty of their assembly. First, the adjoining pipe-ends must be set apart to allow the assembler to position the gasket before pushing it over the first pipe-end. Then, the second pipe-end must be brought into alignment to receive the other side of the gasket. This procedure can be quite laborious for large diameter pipes, with cranes and other mechanical assistances often being necessary. This procedure negates the desired procedure of pre-positioning a full line of pipe-lengths in ceiling-hung or surface-laid systems. Also, removal or replacement of the coupling, as where the gasketing is damaged by fire, becomes difficult, as it may be necessary to disassemble a large number of pipe-lengths to change one coupling. The split-ring gasket coupling is preferable over its full-ring counterpart in that it overcomes the limitations listed above.

In addition, where a side-outlet is incorporated into a full-ring gasket coupling, the gasket must provide for an opening into the main piping and maintain the sealing integrity of the coupling housing at the side-outlet. Providing for such side-outlet in the wall of a full-ring gasket requires molding techniques more complicated than those necessary to produce a similar split-ring gasket. The result is higher production costs for the full-ring side-outlet gasket. While split-ring gasket couplings offer obvious advantages over full-ring gasket couplings, they have serious limitations of their own. Foremost among these is their succeptability to leakage along the axially extending sealing lines defined by abutting free ends of the gasket sections. In the known designs of split-ring gasket couplings, the axially extending sealing lines are aligned with the plane of contact of the opposed ends of the housing segments, or, where the housing segments do not actually touch, they are aligned with the space between the opposed ends of the housing segments. There is, therefore, nothing in such designs to prevent cold-flow of the gasketing material outwardly between the ends of the housing segments. Fluid-flow along the axially-extending sealing line is also possible, as there is no inner wall surface of a housing segment to impede its progress.

It is a general object of the present invention to provide an improved split-ring gasket pipe coupling which overcomes the disadvantages associated with the prior art. Accordingly, it is an object of the present invention to provide a coupling having novel means for positioning a split-ring gasket within the coupling to promote better sealing better abutting free ends of the split-ring gasket.

A further object of the present invention is to provide an improved split-ring gasket coupling of the side-outlet type. The known types of pipe couplings provide cumbersome nut and bolt locking means which require considerable dexterity on the part of the assembler. Typically, the nut must be removed from the bolt before the coupling housing can be closed, and then must be replaced and tightened. This is usually carried out while holding the housing segment in alignment under adverse conditions, such as on scaffolding. It is, therefore, a further object of the invention to provide a pipe coupling having a simple, inexpensive locking means which allow for the closing of the housing segments without the need for removal and replacement of the nut and bolt assemblies.

The above and further objects and novel features of the invention will more fully appear in the following description, when the same is read in conjunction with the accompanying drawings. It is to be expressly understood, however, the drawings are for the purpose of illustration only, and are not intended as a definition of the limits of the invention.

BRIEF DESCRIPTION OF THE DRAWINGS

In the drawings, wherein like reference characters refer to like parts throughout several views, FIG. 1—Is a perspective view of the preferred embodiment of pipe coupling according to the invention shown in the closed position connecting the ends of the two main pipes, and having a side-outlet on its upper housing segment.

FIG. 2b—Is a perspective view similar to FIG. 2a, but with the gasket means removed.

FIG. 3a—Is a perspective view of one section of the gasket means of FIG. 2a.

FIG. 3b—Is a second perspective view of one section of the gasket means of FIG. 2a.

FIG. 4—Is a fragmentary transverse elevational view of the coupling of FIG. 1, with the main pipes removed, showing the novel means for positioning of the gasket means and the novel locking means.

FIG. 5—Is a view in longitudinal axial section through the coupling of FIG. 1.

FIG. 6—Is a view in transverse section taken along the lines 6—6 of FIG. 5, in the region of the hollow boss on the upper housing segments.

FIG. 7—Is a view corresponding to FIG. 6, but with the coupling in a position intermediate between the open and closed position.

FIG. 8a—Is a view in longitudinal axial section through a further embodiment of coupling in accordance with the invention, such coupling providing means for coupling to main pipes of differing diameters, and also providing side-outlets on both housing segments.

FIG. 8b—Is a perspective view of one section of the gasket means of FIG. 8a.

FIG. 9—Is a perspective view of an additional embodiment of the gasket means in accordance with the invention, wherein parallel circumferential ribs are provided on the exterior of the gasket means, such view being taken in a manner similar to that in FIG. 3a.

FIG. 10—Is a perspective view of a further embodiment of the gasket means according to the invention, such embodiment providing for solid end-walls on the free ends of the gasket means.

DESCRIPTION OF THE PREFERRED EMBODIMENTS

Figure 1:
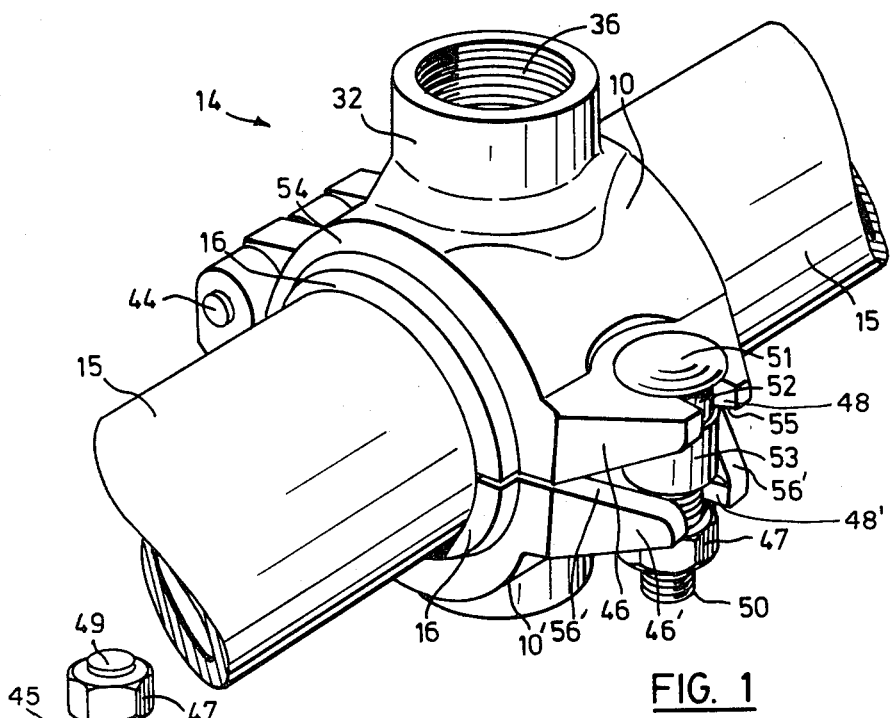

Referring to the drawings, the pipe coupling device comprises two arcuate housing segments 10 and 10', each segment having opposable ends 11. The housing segments, which may be made of cast or forged metal, PVC plastic, or other suitable material, are movable from an open position (FIGS. 2a and 2b) to a closed position (FIGS. 1, 4, 5 and 6) in which the opposable ends 11 are brought into opposition, thereby defining a coupling housing, designated by the general reference numeral 14, of generally circular configuration. The housing 14 engages the pipes 15 to be coupled by means of arcuate flanges 16 located at axially opposite ends of each housing segment 10, 10'. Each housing segment has a continuous inner wall surface 12, (see FIG. 2b), which, in the preferred embodiment, has slanting side walls 13.

The coupling housing 14 has fitted within it arcuate gasket means 17, which has free ends 18, 18' adapted to abut along an axially extending sealing line 19 (see FIG. 4). It will be understood that the gasket means may have a one-piece construction with a single break in its circular continuity, in which case there are two free ends and one axially extending sealing line, or, as shown in the drawings, the gasket means may be composed of one or more arcuate gasket sections, with each section having two free ends. In the preferred embodiment shown, there are two gasket sections with two sealing lines 19, 19'. As shown, the gasket means 17 is generally C-shaped cross-section, with outer 20, and side 21 surfaces, together defining an interior of said gasket means. The outer surface 20 of each gasket section is generally complimentary to the continuous inner wall surface 12 of the corresponding arcuate coupling housing segment 10, 10'. Side surfaces 21 of the gasket means are formed at the axially opposite ends of the outer surfaces 20, and slant radially inwardly in an axially outwardly direction as shown, so as to be accurately received within slanting side walls 13 of the coupling housing segment 10 and 10'. Inner surfaces 22, adapted for sealing with the pipes 15, are formed at the axially opposite ends of the interior of the gasket means. In the preferred embodiment shown, the side surfaces comprise a sealing lip having a first axially extending portion 22a, which is parallel to the axis of the coupling 14, and a second radially extending portion 22b, which extends radially inwardly from the axial inward end of the first portion 22a. The first portion 22a lies flat on the surface of the pipe 15, exerting a compressive force against that surface in the closed position. The second portion 22b, is angled radially inwardly in the relaxed or non-compressed condition and is pushed outwardly into alignment with the first portion when the coupling 14 is closed, thereby applying pressure against the surface of the pipe 15. The upper surface 23 of the second portion is acted upon by internal pressures in the coupling, thereby resulting in an additional sealing load against the pipes 15.

It will be appreciated that upon outward deflection of the second portion 22b of the sealing lip into alignment with the first portion 22a, there will occur a circumferential retraction of the said second portion in the region of the abutting free ends 18 of the gasket sections 10, 10'. Such retraction of the second section 22b results in a gap in the gasketing material in the region of the axially extending sealing line 19. To compensate for this circumferential retraction, a projection 24 of the second radially extending portion 22b, which extends circumferentially from the general surface of the free ends 18, 18' of the gasket means, is provided. In the preferred embodiment shown, each of said second sections features an equal circumferential extension. However, other arrangements are considered to be within the scope of this invention. For example, either free end 18 or 18' of an arcuate gasket section may have no such projection, while the abutting free end of the opposed gasket section may present a projection which alone counteracts the retraction.

The coupling of the present invention provides novel means for the positioning of the gasket means within the coupling housing such that, in the closed position of the housing segments 10, 10', the radially outer side of the sealing line 19 is spaced circumferentially from the opposed ends 11, 11' of the housing segments and is in contact with the continuous inner wall surface 12 of one of the said housing segments. By such means, the invention overcomes the problems of cold-flow and leakage associated with known split-ring gasket couplings. These means comprise a recess, which, in the closed position of the housing segments 10, 10', is defined by adjoining radially outwardly extending depressions 27, in the end region of the inner wall surface 12 of said opposing housing segments. The said means additionally comprise radially outwardly projecting lugs 25, 25' adjacent to and co-extensive with abutting enlarged free ends 18, 18' of the gasket means 17, the projecting lugs 25, 25' of abutting enlarged free ends 18, 18' completely occupying the recess.

The radially outwardly projecting lugs 25, 25' are generally rectangular in cross-section, having a shoulder 28 with their circumferentially free ends being coincident with the enlarged free ends 18, 18' of the gasket sections. Thus, the lugs 25, 25', in addition to their locating function, aid in the sealing between opposed gasket sections by providing a radially extended surface of abutment on the free ends 18, 18'. It will be seen from FIGS. 2a, 3a, 3b and 9 that one lug 25 of each gasket section is shorter in circumferential length than the opposite lug of the same gasket section 25'. The two gasket sections are mirror images of each other, and are brought into opposition in the closed position so that the free end 11 of the shorter lug 25 of one section is opposed to the free end 11 of the longer lug 25' of the other section. The depressions 27 have a shoulder 29, which demarcates their inner circumferential limits. Each depression is generally rectangular in shape and of equal dimensions to the adjoining depression. As the abutting lugs 25 and 25' of unequal circumferential length completely occupy the recess defined by the two equally sized depressions 27, 27', it will be appreciated that the axially extending sealing line 19 will be spaced circumferentially from the opposed ends of the housing segments 10, 10', and furthermore, the said sealing line 19 will be in contact with the continuous inner wall surface 12 of one of the housing segments 10 or 10'. In FIG. 4, it will be seen that the sealing line 19' at the right of FIG. 4 is in contact with the continuous inner wall 12 of the upper housing segment 10, while the sealing line 19 to the left of FIG. 4 is in contact with the continuous inner wall 12 of the lower housing segment 10'.

Preferably, the lugs 25 and 25' are oversized with respect to the recess. That is, the two lugs together define a composite lug element having a volume greater than the volume of the recess. This oversizing creates additional compressive loading along the axially extending sealing line 19, thereby increasing the effectiveness of sealing between abutting free ends 18, 18'.

The housing depression shoulders 29 also aid in this sealing by acting as a stop to retain much of the compressive loading in the lug regions adjacent to the free ends 18, 18' of the gasket sections.

Figure 2A:
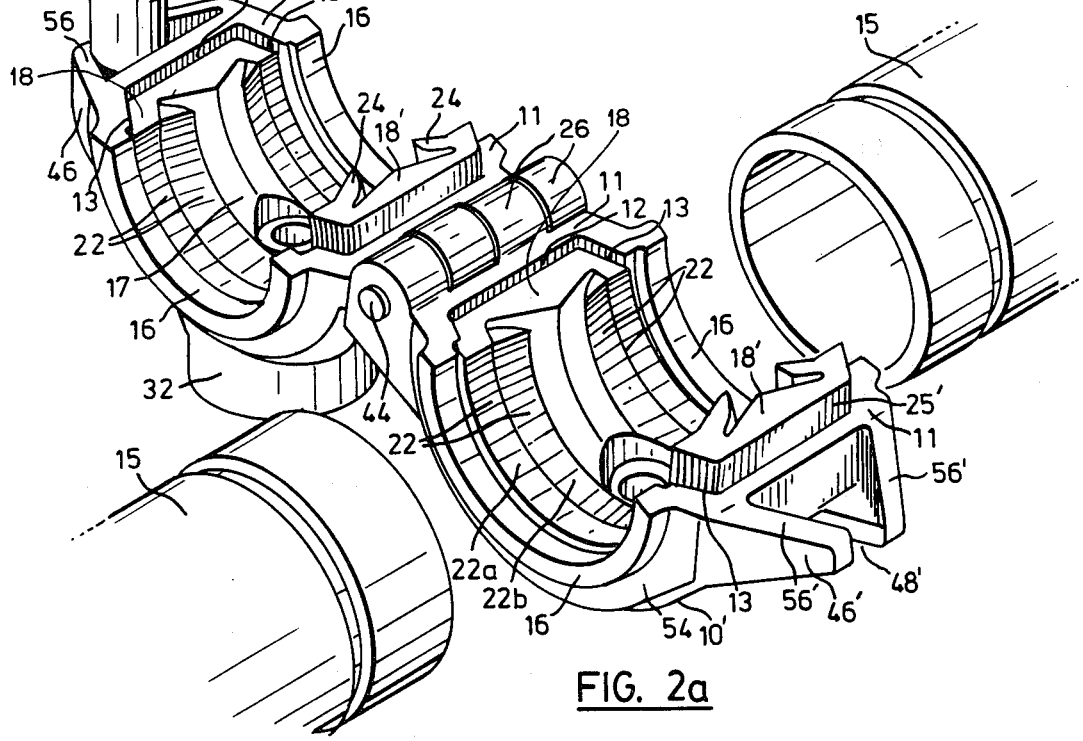
FIG. 2a—Is a perspective view corresponding to FIG. 1 but with the coupling in the open position and with the main pipes moved axially outwardly, to reveal a two section gasket means.

The coupling of the present invention provides releasable locking means, designated by the general reference numeral 45. These locking means cooperate with the housing segments 10, 10' to lock the segments together in the closed position, as shown in FIG. 1. While any known form of locking means may be used, novel means are herein disclosed which provide a simple, low-cost and effective locking device which eliminates loose parts and permits the coupling housing to be closed around the pipes 15, 15' with a minimum of effort and dexterity by the assembler. The novel locking means comprise first 46 and second 46' opposing bolt pads on the two housing segments 10, 10', respectively, each of said bolt pads having a radially extending open-ended slot 48, 48', a nut 47 and a bolt 49 having a threaded shaft 50 and a head 51 which is retained on the slot 48 of the first opposed bolt pad 46 by a resilient cylindrical ferrule 53 engaging the threaded shaft 50 of the bolt 49 in the head region and having one end engaging resiliently an adjacent side surface 55 of the slot 48 of the first opposing bolt pad 46. The bolt 49 used in this locking means assembly is of the standard oval track neck type and the assembly utilizes the narrow section of the oval neck 52 to locate the bolt 49 in the slot 48 of the first bolt pad 46. FIG. 4 shows in solid lines the bolt 49 in place with the neck 52 in the slot 48 and a soft rubber ferrule 53 pushed into position on the threaded shaft 50 of the bolt 49 with the end closest to the head engaging the adjacent side surface 55 of the slot 48 of the first bolt pad 46. In this position, the ferrule 53 prevents the bolt from sliding out of the slot 48, but allows the bolt/nut assembly to pivot outwards (dotted lines) sufficiently for nut 47 to ride past the extreme edge of the second opposed bolt pad 46' before slipping into the slot 48' of the second bolt pad 46'. In the preferred embodiment illustrated, there is provided an inclined cam surface 56' on both sides of the second bolt pad 46' which contacts the end of the assembled nut 47 during closing of the housing segments 10, 10', thereby causing the outward pivoting of the nut 47 and bolt 49 to the position shown in broken lines in FIG. 4. On further closure movement, the compressive action of the rubber ferrule 53, when pivoting the bolt 49, acts to return the bolt to its vertical position, as shown in solid lines in FIG. 4, so facilitating the rapid assembly of the coupling 14 on the pipes 15 and frequently permitting the coupling to be assembled around the pipe using only one hand. Once in the vertical position shown in the solid lines of FIG. 4, the nut is tightened to lock the two housing segments 10, 10' together in the closed position. The length of the rubber ferrule 53 is such that when in the secured position of FIG. 4, it engages the last two or three threads of bolt 49, thus preventing the ferrule from sliding back up the bolt during the compressive action of the bolt pivoting.

It is also an object of the present invention to incorporate the novel features hereinbefore described in a pipe coupling having one or more side-outlets for attachment of branch pipes. Accordingly, the preferred embodiment of pipe coupling illustrated in FIGS. 1, 2a, 2b, 5, 6 and 7 has located upon the upper housing segment 10, at a substantially central position, an upwardly extending hollow boss 32, said hollow boss being in communication with the interior 33 of the coupling housing 14. Means are provided on the hollow boss 32 for the connection of a side-outlet pipe. The means shown comprise internal threading 36 of the hollow boss 32 for mating with a branch pipe which is correspondingly threaded. Any other known means of connecting branch pipes to the hollow boss 32 may be used.

An upwardly projecting recess 34, defined by a generally conical side surface 34a, and a generally half-circular upper surface 34b, is provided in the inner wall surface 12 of the housing segment 10. The recess as shown is annular, surrounding the opening of the hollow boss 32 into the interior 33 of the coupling housing 14. The purpose of this recess will become apparent from the description below.

The gasket means 17 has formed on its outer surface 20 a hollow outwardly extending resilient boss, generally designated by the reference numeral 37. This resilient boss 37 is positioned on the outer surface 20 such that its axis is in alignment with the axis of the hollow boss 32 of the housing segment 10 when the coupling is in the closed position (see FIGS. 4 and 5). The resilient boss 37 is comprised of an other side-wall 38 and an inner side-wall 39.

The outer side-wall 38 of the resilient boss 37 is generally complimentary to and adapted to be received within the upwardly projecting recess 34 of the housing segment 10. The outer 38 and inner 39 side-walls terminate at their outer axial extents in an annular sealing lip 40, which, under compression in the closed position, forms a seal between itself and the confronting complimentary surface of the upwardly projecting recess 34. In the preferred embodiment, the confronting complimentary surface of the recess 34 comprises the generally half-circular upper surface 34b.

To increase effective sealing around the side-outlet opening the inner side-wall 39 may be provided with a circumferential groove, generally designated by the reference numeral 42, defined by an upper face 43a and a lower face 43b. The upper portion of the resilient boss 37, comprising that portion of the resilient boss above the lower face 43b, is deflectable from the uncompressed condition (FIG. 7) to the compressed condition (FIG. 6) upon closure of the coupling housing segments 10, 10'. In the compressed condition the upper face 43a is in partial contact with the lower face 43b. This deflection of the upper portion of the resilient boss 37 results in additional compressive forces being exerted by the annular sealing lip 40 against the generally half-circular upper surface 34b and by the outer side-wall 38 against the generally conical side surface 34a and the exposed portion of the lower face 43b can be acted on by positive fluid pressures, thus augmenting the sealing action.

The opposable end 11 of the housing segments 10, 10' may be brought into opposition by any well-known means, such as nut and bolt assemblies at both ends of the housing segment. However, as previously outlined, such arrangements are cumbersome, consisting of many loose parts, which require substantial dexterity on the part of the assembler. Therefore, to provide for a coupling that is both easy and quick to assemble and disassemble, the preferred embodiment has the two housing segments 10, 10', pivoted together at one end and provided with releasable locking means 45, at the end opposite the pivoting end. The two housing segments 10, 10' may be pivoted together by means of a pivot pin 44 which engages opposing ears 26 formed at the free ends 11 of the respective housing segments.

Another modified embodiment of the pipe coupling and gasket means used therein is shown in FIGS. 8a and 8b. This embodiment includes the features already described in a coupling capable of joining two main pipes 15, 15' of different outside diameters. In addition, this coupling is equipped with an upwardly extending hollow boss 32, 32' on each of the two housing segments, 10, 10'. It will be noted that the hollow bosses are bored and tapped to accept branch pipes of unequal outside diameters. This embodiment differs further from the preferred embodiment of FIGS. 1, 2a, 2b, 4 and 5 in that the outer 38 and inner 39 side-walls of each resilient hollow boss increase gradually in axial dimensions from a minimum, to the left of FIG. 8a to a maximum, at the right of FIG. 8b, so as to accommodate the decreased outside diameter of the pipe 15'. The dimensions of the annualar sealing lip 40, and of the upper 43a and lower 43b faces remain constant. Also, the outer main side-walls 54, 54' of both coupling segments 10, 10' are axially extended to accommodate the decreased outside diameter of pipe 15', and each of said side-walls terminates in a flange 16' said flanges together defining a diameter smaller than that defined by the axially opposite flanges 16, 16'. This change in flange diameter necessitates an inward slanting of the continuous inner wall surface 12 of the coupling segments 10, 10', and a corresponding inward slanting of the outer surface 20 of each gasket section (see FIG. 8b). In all other respects, the dimensions and arrangement of the various components correspond to those of the preferred embodiment.

FIGS. 9 and 10 show further modifications of the gasket means 17 of the present invention.

In FIG. 9, two circumferential ribs 30 have been added to the outer surface 20 of the gasket means 17. The gasket section is in all other respects identical to that shown in FIG. 3a. These ribs have been found to enhance the sealing at the inner surfaces 22, 22' especially when excessive radial deflection of the pipes 15 occurs.

FIG. 10 shows a section of gasket means 17, having a main arcuate extent of generally C-shaped cross-section. This gasket section is similar to the gasket sections shown in FIGS. 2a, 3a, and 3b, with the exception that the free end 18' of the section forms a solid end wall 31' for abutment against a second solid end wall (not shown) of an opposing gasket section. It will be noted that the radially inner part of the solid end wall 31' extends upwardly beyond the general plane of the wall 31' to provide circumferentially extending projections, similar to and having the same purpose as, the projections 24, 24' of the second portions 22b, 22b' of the axially opposite inner surfaces 22, 22' of the embodiment described above with reference to FIGS. 3a and 3b.

Although only a limited number of embodiments of the invention have been illustrated in the accompanying drawings and described in the foregoing specification, it is to be especially understood that various changes, such as in the relative dimensions of the parts, materials used, the number and placement of side outlets, and the like, as well as the suggested manner of use of the apparatus of the invention, may be made therein without the parting from the spirit and scope of the invention, as will be apparent to those skilled in the art.

What I claim as my invention is:

1. A pipe coupling device comprising two arcuate housing segments, each having opposable ends and a continuous inner wall surface, said housing segments being movable from an open position to a closed position in which said opposable ends are brought into opposition, said housing segments thereby defining a generally cylindrical coupling housing which is adapted to engage the pipes to be coupled;

arcuate gasket means of generally C-shaped cross-section within the coupling housing, said gasket means having radially enlarged free ends defining substantially planar surfaces adapted to abut along an axially extending sealing line;

a recess defined in the closed position of said housing segments by adjacent radially outwardly extending depressions in the end region of the inner wall surfaces of the two opposing housing segments;

radially outwardly projecting lugs on said gasket means adjacent to and co-extensive with the enlarged free ends, wherein the lugs interact with the recess to position the gasket means within the coupling housing in the closed position of the housing segments so that the radially outer side of said sealing line is spaced circumferentially from the opposed ends of said housing segments and is in contact with the inner wall surface of one of said segments;

a sealing lip formed at axially opposite ends of the interior of the gasket means, said sealing lip comprising a radially inwardly extending portion terminating at at least one enlarged free end of the gasket means in a projection extending circumferentially from and beyond the generally planar surface of said enlarged free end, whereby circumferential retraction of said sealing lip is compensated for to maintain a complete circumferential surface to seal under internal pressure; and releasable locking means cooperating with the housing segments for locking the segments together in the closed position.

2. A coupling according to claim 1 wherein the enlarged free ends of the gasket means form a solid end wall for abutment.

3. A coupling according to claim 1 in which:
- at least one of the arcuate housing segments has a radially upwardly extending hollow boss thereon, said hollow boss being in communication with the interior of the coupling housing;
- means are provided on the hollow boss for the connection of a side-outlet pipe;
- an upwardly projecting recess surrounding the opening of the hollow boss into the interior of the coupling housing is provided in the inner wall surface of the housing segment; and
- at least one hollow outwardly extending resilient boss is formed on the gasket means, said resilient boss having outer and inner side-walls, said outer side-wall being generally complimentary to, and adapted to be received within, the upwardly projecting recess of the corresponding housing segment, said side-walls terminating at their outer axial extents in an annular sealing lip which is adapted to form a seal between itself and the confronting complimentary surfaces of said recess.

4. A coupling according to claim 3 wherein the inner side-wall of the resilient boss is provided with a circumferential groove defined by an upper and a lower face, the upper portion of the resilient boss being deflectable from an uncompressed condition to a compressed condition in which said upper face is in contact with said lower face.

5. A coupling according to claim 1 in which said housing segments are pivoted together at one end and are provided at the opposite end with releasable locking means comprising:
- first and second bolt pads on the two housing segments, respectively;
- a nut and a bolt having a threaded shaft and a head, one end of said nut and bolt connected by resilient pivoting means to the first bolt pad; and
- an inclined cam surface on the second bolt pad which contacts the other end of said nut and bolt upon closing of the housing segments for outward pivoting of the nut and bolt.

* * * * *